United States Patent [19]

Rivin

[11] Patent Number: 4,557,703
[45] Date of Patent: Dec. 10, 1985

[54] ELASTOMERIC SPIDER COUPLING

[76] Inventor: Evgeny I. Rivin, 17641 Wiltshire Blvd., Lathrup Village, Mich. 48076

[21] Appl. No.: 316,436

[22] Filed: Oct. 29, 1981

[51] Int. Cl.$^4$ .............................................. F16D 3/64
[52] U.S. Cl. ........................................ 464/73; 464/87
[58] Field of Search ..................... 464/73, 87, 93, 92, 464/105, 104, 76, 94, 96

[56] References Cited

U.S. PATENT DOCUMENTS

| 2,022,626 | 11/1935 | Weis | 464/73 X |
| 2,074,941 | 3/1937 | Ricefield | 464/73 |
| 2,135,634 | 11/1938 | Byron | 464/73 X |
| 2,295,003 | 9/1942 | Natkins | 464/73 X |
| 3,638,454 | 2/1972 | Croset | 464/76 |
| 3,837,179 | 9/1974 | Barth | 464/76 |

FOREIGN PATENT DOCUMENTS

| 2439558 | 2/1976 | Fed. Rep. of Germany | 464/73 |
| 2609008 | 9/1976 | Fed. Rep. of Germany | 464/73 |
| 1239717 | 7/1971 | United Kingdom | 464/73 |
| 720227 | 3/1980 | U.S.S.R. | 464/73 |

Primary Examiner—Stuart S. Levy
Assistant Examiner—Daniel P. Stodola

[57] ABSTRACT

A coupling for joining a pair of shafts which are rotatably supported without a common axis in such a manner as to accommodate misalignment and provide torsional flexibility includes hubs on the ends of the two shafts, each of the hubs having axially extending cams with opposed surfaces that create openings for insertion of deformable members. A spider-like coupling element formed of a rubber-like material has a central base and legs which extend from the base into the openings to contact the opposed cam surfaces. The legs of the coupling element are circular or elliptical in cross section so that they contact the opposed cam surfaces essentially at lines when there is no load on the coupling and the legs deform in unconstrained compression to increase their area of contact with the opposed cam surfaces as the load increases, creating a nonlinearity in the relationship between the stiffness of the coupling and the applied torque.

4 Claims, 10 Drawing Figures

ELASTOMERIC SPIDER COUPLING

DESCRIPTION

1. Technical Field

This invention relates to connecting elements for mechanical transmissions and in particular to shaft couplings.

2. Background Art

Shaft couplings in which a resilient member is provided between the driving and driven parts (hubs) of the coupling are known and widely used. Since small size and low values of weight and rotary inertia are frequently of critical importance, spider or jaw-type couplings are very popular. It is known (e.g., see E. Rivin, Comparison and Selection of Couplings, Proceedings of 5th National Conference on Power Transmission, Illinois Institute of Technology, 1978), that the spider couplings have the smallest size and the lowest weight and rotary inertia for a given rated torque. However, they also possess the highest values of both torsional stiffness and stiffness for misalignment compensation (see quoted paper). Thus, spider couplings of conventional design provide very poor isolation of torsional vibrations and also very poor compensation of forces due to inevitable shaft misalignment. This latter factor leads to excessive dynamic loading of the shaft bearings and, subsequently, to their premature failure and intensive noise.

Another shortcoming of the conventional spider couplings is fast deterioration of the elastomeric spider due to stress concentration in the sharp corners of the spider legs having rectangular cross section. Modifications of the spider leg cross section such as proposed by Weis in the U.S. Pat. No. 2,022,626 alleviate but do not resolve the problem of stress concentration.

DISCLOSURE OF THE INVENTION

This invention is directed to an improved form of connecting coupling for mechanical assemblies, especially for power transmitting shafts. Broadly, the invention involves using an elastomeric spider for the spider couplings in which the load-carrying "legs" of the spider have "multiple elliptical" cross sections. Initially, with no load transmitted through the coupling, each leg contacts corresponding cams on the driving and driven hubs along narrow lines, but as the transmitted load increases, width of the contact strip-like surfaces increases, thus both the stiffness and internal stresses in the leg also gradually go up. Due to the perfect geometrical shape of an ellipse, whose contour does not have either sharp edges or any discontinuities of higher order, stresses inside the cross section are distributed in a very uniform way, without local concentrations. While the transmitted load is increasing the shape of the cross section is changing to accommodate this increase.

This invention provides a spider coupling with the same or higher rated torque for a given size as a coupling with a conventional spider.

This invention also provides a spider coupling having a nonlinear relationship between the transmitted torque and angular deflection, which is very beneficial for abatement of undesirable torsional vibrations.

This invention further provides a spider coupling demonstrating over all or over the large portion of its transmitted torque range much lower torsional stiffness and much lower stiffness in radial and angular directions of the misalignment compensation than does a coupling with the conventional spider design.

This invention also provides a spider coupling whose spider demonstrates much better fatigue resistance and tolerance to overloading than a spider of the conventional design.

This invention also provides a spider coupling whose hubs are interchangeable with the hubs of the conventional spider couplings.

Other objectives, advantages and applications of the present invention will be made apparent from the following detailed description of the preferred embodiments of the invention.

BEST MODE FOR CARRYING OUT THE INVENTION

Figure 1:
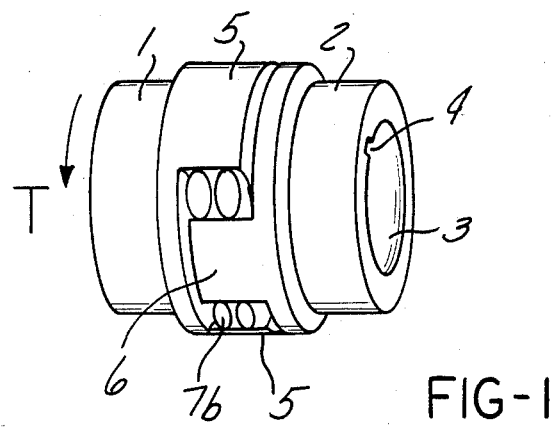
FIG. 1 illustrates a spider coupling according to the first embodiment of my invention wherein the protrusions (legs) of the spider consist of two cylinders having elliptical cross section.
Figure 2:
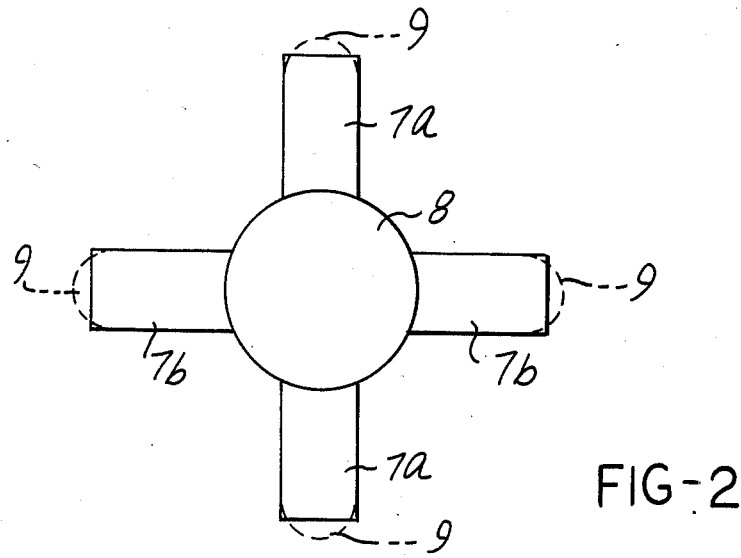
FIG. 2 illustrates a face view of the spider of FIG. 1.

Referring to FIG. 1, 1 and 2 are the driving and driven hubs, respectively (their roles can be reversed). The hole 3 with the keyslot 4 is engaged with the driven shaft and, similarly, the driving shaft is engaged with the hub 1. Each hub has an equal number of the axially extending cams 5, 6 on the hubs 1, 2 respectively. The spider made of elastomer or other material and shown in FIG. 2, is situated between the hubs 1 and 2 in such a way that its base 8 is accommodated in recesses correspondingly provided in the hubs, and each of its protruding legs 7 is located between a pair of cams 5, 6, thus the torque is transmitted from the driving shaft and the hub 1 to the driven shaft and the hub 2 through the spider legs 7, which are compressed by the tangential force.

Figure 3:
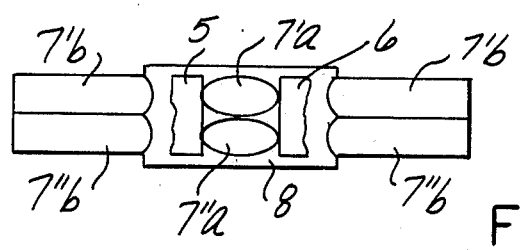
FIG. 3 illustrates a side view of the spider according to the first embodiment of my invention wherein the cross section of each spider's leg is of "multiple elliptical" shape and all elliptic elements of the cross section are identical.
Figure 4:
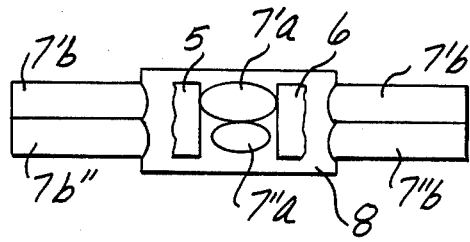
FIG. 4 illustrates a side view of another embodiment of the invention wherein the cross section of each spider's leg is of "multiple elliptic" shape constituted of non-identical ellipses.

Each leg 7 of the spider, shown in FIGS. 1, 3, 4 is formed by two cylinders built into and radially protruding from the base 8. These cylinders have identical (as shown in FIG. 3) or different (as shown in FIG. 4) crossections.

In operation, transmission of a torque T from the hub 1 to the hub 2, as shown by the arrow in FIG. 1, leads to compression of the leg 7a by the tangential force and loosening of the spider leg 7b, as they are shown in FIG. 1. If the spider had more than two legs, but an even total number of legs as is usually the case, then the legs around the circumference of the coupling are alternately compressed and loosened.

When the magnitude of the torque T is low the magnitude of the tangential force compressing the legs is also low. The stiffness of an elastomeric cylinder of elliptical cross section is relatively low at low compression forces and is progressively increased with increasing force.

Figure 5:
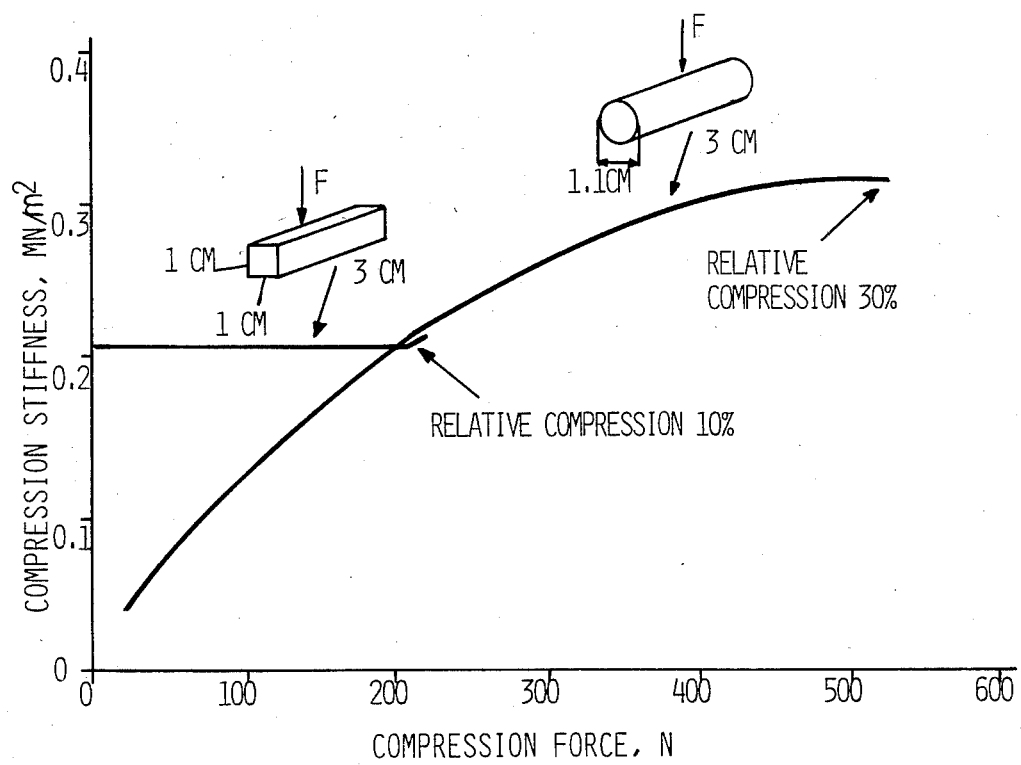
FIG. 5 illustrates typical relationships between the compression force and compression stiffness for an elastomeric cylinder compressed between the two planes parallel to its axis for a rectangular and an elliptical cross section of the cylinder, both having approximately equal cross section area.

Stiffness of an elastomeric round cylinder (65 Durometer, 1.1 cm diameter, 3 cm long) is plotted in FIG. 5 (curve 1) in comparison with stiffness of a rectangular elastomeric block of the same Durometer and length and approximately the same cross section area (curve 2). Data is shown up to the relative compression 0.1 for the rectangular block (generally accepted as the maximum allowable compression at a rated load for rectangular rubber blocks) and up to the relative compression 0.3 for the cylinder (tentatively recommended conservative value for round cylinders, increased due to reduced stress concentration).

As FIG. 5 shows, compression stiffness of the cylindrical block is substantially lower than the same of the rectangular block, representing the spider leg of a conventionally designed spider coupling. This relationship holds at least up to 90% of the rated load for the conventional design.

Thus establishes that torsional stiffness of a coupling with the cylindrical spider legs is greatly reduced as compared to a coupling with the conventional spider. Also, the load-carrying capacity of the spider as shown in FIGS. 1–3 is substantially higher than the same for the conventional spider of comparable dimensions.

It is known, that laterial (shear) stiffness of an elastomeric body loaded in compression is in the first approximation proportional to its compression stiffness. The shear stiffness of the spider legs together with their compression stiffness are the main factors determining the compensating stiffness of a coupling (see paper by Rivin referred to on p.1). Thus, the compensating stiffness of the coupling shown in FIGS. 1–3 is substantially less than that of a conventional spider coupling with rectangular spider legs, especially at the lower transmitted torques. It is well known that the majority of industrial machinery is loaded to only 20–50% of its nominal capacity for most of their operational time. Thus, reduction of the compensation stiffness even at lower transmitted loads only, would greatly reduce the total level of misalignment-induced loads on the shaft bearings.

Figure 6:
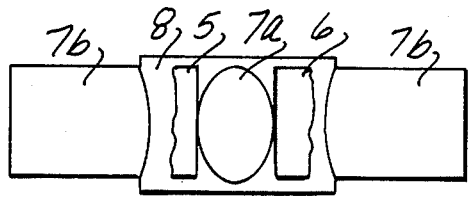
FIG. 6 illustrates a side view of yet another embodiment of my invention wherein the cross section of each spider's leg is a single ellipse.
Figure 7:
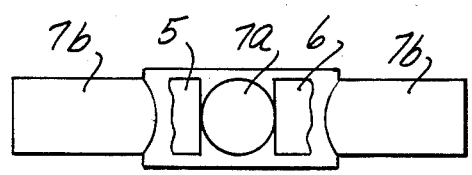
FIG. 7 illustrates a side view of another embodiment of my invention wherein the cross section of each spider leg is a circle.

In the design of the spider leg shown in FIGS. 2, 3, 4 the elliptical cylinders are compressed along their long diameters. Thus leads to enhanced compliance of the coupling but, of course, with relatively reduced load-carrying capacity as opposed to an elliptical cross section spider leg compressed along its short diameter as shown in FIG. 6. The latter provides for higher load-carrying capacity but with higher stiffness. Elliptical cross section with equal long and short diameters (round), as shown in FIG. 7, provides for intermediate characteristics of the coupling.

In cases when even more substantial nonlinearity (increase in stiffness with increasing load) is required, the design shown in FIG. 4 can be beneficial. In this design, each leg of the spider is composed of elliptical cylinders having non-identical cross sections. Thus, at low levels of the transmitted torque, only the cylinders with larger dimensions in the direction of the tangential force (those marked with a double prime symbol in FIG. 4) will be compressed. After the absolute deformation (compression) of these cylinders exceeds the difference between the dimensions of the component cylinders (comprising the leg) in the direction of the tangential force, smaller cylinders (those marked with single prime symbols in FIG. 4) will take a portion of the transmitted payload, additionally increasing stiffness and load-carrying capacity.

Figure 8:
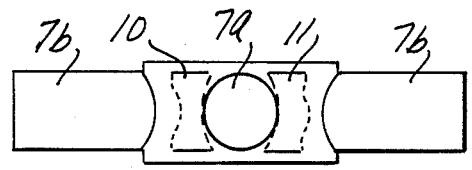
FIG. 8 illustrates another embodiment of my invention wherein each leg has a semielliptical dome at the end.

Another way to achieve stiffness/load-carrying capacity modification is to modify the shape of the engaging surfaces of the cams 5,6 on the driving and driven hubs. If these surfaces are made concave as illustrated in FIG. 8 (cams 10, 11 on the driving, driven hubs, respectively), then the reduction of the free surface of the elliptical cylinders under compression would occur faster than if the engaging surfaces on the cams were flat. Accordingly, stiffness would increase faster for a given rate of increasing of the transmitted torque.

Figure 9:
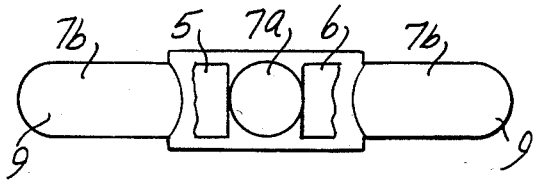
FIG. 9 illustrates a side view of yet another embodiment of my invention wherein the hub surfaces engaged with the legs have concave elliptical cross sections enveloping the legs partially but have more shallow curvature than the legs.

Stress concentration in a cylinder of elliptical cross section under compression is greatly reduced, as compared with a rectangular element. However, the limited length of the cylinder leads to some stress concentration at the free ends. To alleviate this problem and thus to improve fatigue properties of the proposed coupling, a dome-shaped addition at the free end of each elastomeric cylinder can be implemented as shown in FIG. 9 and by dotted lines in FIG. 2. This eliminates all the sharp edges which could be potential sources of stress concentration.

Figure 10:
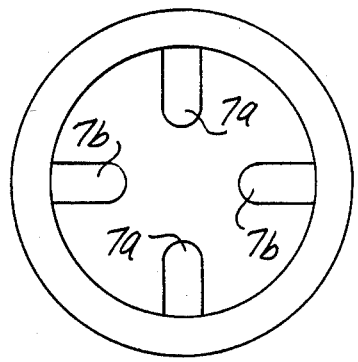
FIG. 10 illustrates a face view of another embodiment of my invention wherein the spider legs protrude from the base situated on the periphery of the spider.

The spiders which are illustrated in FIGURES 1-4 and 6-9, all have their bases 8 situated in the central area of the spider. However, in some cases the embodiment shown in FIG. 10 has certain advantages. In this design, the legs 7 are embedded in the ring-shaped base 12 which is situated on the periphery of the spider.

For consistency of description, the spider legs in the test were always referred to as having cylindrical shape. However, this should not be construed as rejection of other shapes of the spider legs. The critical feature of my invention is a multiple or single elliptical cross section of the spider leg to eliminate stress concentration. This is equally valid for cylindrical as well as for conical or even irregular shaped legs.

The invention has been described with reference to specific embodiments, and it is to be understood that although the embodiments represent the best mode in practicing the invention known to the inventor at the time of filing the patent application, various modifications to the illustrated embodiments are possible and accordingly the foregoing description is not to be construed in a limiting sense.

I claim:

1. A shaft coupling for connecting the adjacent ends of two mechanical members, at least one of which is rotatably supported, comprising:

first and second hubs on said two mechanical members, respectively, said hubs having axially extending cams with opposed surfaces of said cams creating common openings for insertion of deformable members;

a spider-like coupling element having a central base and radially extending deformable legs which extend into said common openings to contact the opposed cam surfaces;

each of said deformable legs consisting of multiple cylinders, said cylinders having elliptical cross sections and said deformable legs accomodating torque between said two mechanical members by means of unrestrained compression deformation, said opposed surfaces and said deformable legs being shaped such that the contact area between said opposed surfaces and said deformable legs increases with increased torque transmission between said mechanical members.

2. A shaft coupling of claim 1 wherein said cylinders in cross section axially abut each other.

3. A shaft coupling of claim 1 wherein said elliptical cross sections of said cylinders are not identical.

4. A shaft coupling of claim 1 wherein the free ends of said cylinders are shaped as semi-ellipsoidal domes.

* * * * *